United States Patent [19]

Shinskey

[11] Patent Number: 5,341,288
[45] Date of Patent: Aug. 23, 1994

[54] METHOD AND APPARATUS FOR ANALYZING PROCESS CHARACTERISTICS

[75] Inventor: Francis G. Shinskey, Foxboro, Mass.

[73] Assignee: The Foxboro Company, Foxboro, Mass.

[21] Appl. No.: 889,472

[22] Filed: May 27, 1992

[51] Int. Cl.$^5$ .................................................. G05B 13/02
[52] U.S. Cl. .................................... 364/159; 364/177; 364/487
[58] Field of Search ................ 364/157–159, 364/177, 148, 469, 486, 487, 553; 318/561

[56] References Cited

U.S. PATENT DOCUMENTS

| Re. 33,267 | 7/1990 | Kraus | 364/158 |
|---|---|---|---|
| 3,515,860 | 6/1970 | Fitzgerald et al. | |
| 3,617,717 | 11/1971 | Smith | 364/156 |
| 3,671,725 | 6/1972 | Bakke | 364/159 |
| 3,786,242 | 1/1974 | Brooks | 364/159 |
| 3,867,712 | 2/1975 | Harthill et al. | |
| 3,876,872 | 4/1975 | Spitz | |
| 3,961,234 | 6/1976 | Chambers et al. | 318/561 |
| 3,992,616 | 11/1976 | Acker | |
| 3,995,478 | 12/1976 | Wilhelm, Jr. | |
| 4,186,384 | 1/1980 | Acker | |
| 4,346,433 | 8/1982 | Rutledge | 364/162 |
| 4,441,151 | 4/1984 | Hayashibe | 364/157 |
| 4,602,326 | 7/1986 | Kraus | 364/158 |
| 4,855,897 | 8/1989 | Shinskey | 364/148 |
| 4,903,192 | 2/1990 | Saito et al. | 364/157 |
| 4,959,767 | 9/1990 | Buchner et al. | 364/157 |
| 5,091,844 | 2/1992 | Waltz | |
| 5,124,626 | 6/1992 | Thoen | 318/610 |
| 5,191,521 | 3/1993 | Brosilow | 364/160 |

FOREIGN PATENT DOCUMENTS

0405924 1/1991 European Pat. Off.

OTHER PUBLICATIONS

Shinskev, Process Control Systems, McGraw–Hill, 1988, pp. 150–157.
Ulery et al., "Software requirements for Statistical Quality Control", Instrument Society of America, 1986, pp. 821–828.
Badavas et al., "Principles of Statistical Quality Control . . . " The Foxboro Co., 1988, pp. 1–56.
Badavas et al., "Statistical Process Control Embedded in Open Industrial Systems," ISA, 1988, pp. 1299–1310.
Epperly et al., "Statistical Process Control Integrated with Distributed Control Systems," Nat'l Petroleum Retainers Assoc., 1988, pp. 1–15.
MacGregor et al., "On Line Statistical Process Control," Chemical Engineering Progress, 1988, pp. 21–31.
Shinskey, "How Good are our Controllers in Absolute Performance and Robustness?" Measurement + Control, vol. 23, 1990, pp. 114–121.
Shinskey, "Putting Controllers to the Test," Chemical Engineering, 1990, pp. 96–106.
Shinskey, "Absolute Performance and Robustness Measures . . . " Proceedings: 46 Annual Symposium on Instrumentation . . . 1991, pp. 55–63.
Shinskey, "Model Predictors: The First Smart Controllers," I&CS 1991, pp. 49–52.
Shinskey, "Evaluating Feedback Controllers Challenges Users and Vendors," Control Engineering, 1991, pp. 75–78.
Shinskey, "Controlling Temperature in Batch Reactors," Intech. 1992, pp. 69–72.

Primary Examiner—Jerry Smith
Assistant Examiner—Steven R. Garland
Attorney, Agent, or Firm—Lahive & Cockfield

[57] ABSTRACT

The invention provides improved methods and apparatus for determining characteristics of a process—such as primary and second time constants, dead-time, and gain—by applying a doublet pulse to the process and measuring its response. By way of example, in one aspect of the invention, there is provided a method for generating a signal, $\tau_1$, representing an estimate of a primary time constant of a non-self-regulating process, in accord with the mathematical expression $\tau_1 = (\delta m \tau_a^2)/A+$ is a factor representing the time-wise integration of the controlled variable during the period when the doublet pulse is being applied $\delta m$ is a factor representing an amount by which the manipulated variable is incremented, and $\tau_a$ represents the time period over which the controlled variable signal changes from its original value by a predetermined amount.

44 Claims, 3 Drawing Sheets

METHOD AND APPARATUS FOR ANALYZING PROCESS CHARACTERISTICS

REFERENCE TO RELATED APPLICATIONS

This application is related to the following copending, commonly assigned applications, assigned to the assignee hereof and filed the same day herewith.

U.S. patent application Ser. No. 889,474; for METHOD AND APPARATUS FOR TUNING PROCESS CONTROL EQUIPMENT; and U.S. patent application Ser. No. 889,473, for IMPROVED METHOD AND APPARATUS FOR ADAPTIVE DEAD TIME PROCESS CONTROL.

The teachings of the above-cited applications are incorporated herein by reference.

BACKGROUND OF THE INVENTION

The invention relates to process control and, more particularly, to systems for analyzing processes to determine characteristics such as dead time, primary and secondary time constants and static gain.

Process control refers to a methodology for controlling the operational parameters of a process by monitoring one or more of its characteristics over time. It is used to ensure that the quality and efficiency of a process do not vary substantially during a single run or over the course of several runs. While process control is typically employed in the manufacturing sector, it also has application in service industries.

A process control unit, or "controller," typically operates by comparing values of a process characteristic—referred to as the controlled variable—with a target value to determine whether the process is operating within acceptable bounds. For example, in a process in which fluid flows at a constant rate from a tank that is continuously filled to constant volume, a controller monitors the liquid level and, if necessary to prevent the tank from running dry or overflowing, adjusts an inlet valve to increase or restrict inflow to the tank.

In order to function properly, a controller must be adjusted to accommodate charcteristics of the specific process it will control. This requires identifying process parameters such as the primary time constant (which reflects the rate at which the process responds to changes in input), gain (which reflects the magnitude of response), and so forth.

Prior art techniques for identifying those parameters involve applying a single step to the process, monitoring the process response and, from that calculating the requisite process parameters.

For example, in a text previously authored by him, the inventor hereof suggests the following procedure for determining process dead time:

1. Place the process controller in manual mode and apply a single step to the process.
2. Monitor the resultant change in output of the process.
3. Graphically, or otherwise, determine the point of intersection between (a) the line defining process output prior to application of the step pulse, and (b) the tangent of maximum slope of the process response curve.

The point of intersection identified in step 3 is taken as the dead time.

This and related techniques for determining process characteristics by monitoring response to a single step are generally quite effective. Nevertheless, an object of this invention is to provide more accurate methods and apparatus for analyzing process characteristics.

More particularly, an object of this invention is to provide a method and apparatus for determining process characteristics such as primary and secondary time constants, dead time, and steady state gain, among others, as effectively and accurately as possible.

SUMMARY OF THE INVENTION

The invention achieves the aforementioned objects by providing methods for determining characteristics of a process by applying a doublet pulse to the process and by measuring its response. Those characteristics include primary and second time constants, dead time, and gain. The invention is applicable, for example, in determining characteristics of a process that is to be placed under the control of a process controller. Moreover, the analysis can be carried out by, or in connection with, the controller itself, as adapted in accord with the teachings herein.

The doublet pulse can De applied to the process by the manipulated variable signal output of the controller in accord with the following steps: (i) incrementing the manipulated variable a predetermined amount, $\delta m$; (ii) monitoring the controlled variable to determine the time period, $\tau_a$, for it to change from its original value by an amount, NB; (iii) once the controlled variable has changed by that amount, decrementing the manipulated variable stepwise by an amount $-2 \times \delta m$; (iv) after another time interval $\tau_a$, incrementing the manipulated variable an amount $\delta m$ to bring it to its original value.

Aspects of the invention pertain to methods for determining characteristics of non-self-regulating processes, i.e., those which have no natural equilibrium or steady state. A simple example of such process is shown in FIG. 1a. There, a metering pump 10 removes a constant flow of fluid from a tank 12, while inflow to the tank is controlled by valve 14. If the inflow varies from the outflow, then the tank will eventually overfill or run dry.

In one aspect, the invention provides a method for generating a signal, $\tau_1$, representing an estimate of a primary time constant of a non-self-regulating process. The primary time constant of a non-self regulating process is the time it takes for the output (the controlled variable) to change an amount equal to the step change in its input (the manipulated variable).

According to this aspect of the invention, that signal is generated in accord with the mathematical expression $$\tau_1 = (\delta m \tau_a^2)/A+$$

where $A+$ is a factor representing the time-wise integration of the controlled variable during the period when the doublet pulse is being applied.

For a first-order non-self-regulating process—that is, a process that can be modeled by a first-order differential equation—the invention provides a method for generating a signal, $\tau_d$, representing a dead time of the process. The dead time is the time it takes a change in the process input (i.e., the manipulated variable signal) to be reflected by a change in the controlled variable signal. For example, referring to FIG. 1a if the flow of fluid delivered from the tank is to be delivered at a specific temperature, based on heat delivered by a heater 16 and measured at the pump 10, then the dead time is the time it takes a change in temperature of the fluid to be detected at a temperature sensor.

According to this aspect of the invention, the dead time signal $\tau_d$ is generated in accord with the mathematical expression $$\tau_d = \tau_a - (NB\tau_1/\delta m)$$

For a non-self-regulating process of the second-order, the invention provides a method for generating the signal $\tau_d$ by the following steps:

(i) generating a signal, $t_1$, representing a first time interval as a function of the mathematical expression $$t_1 = NB^* \tau_1 / |\delta m|$$

(ii) generating a signal, $t_2$, representing a second time interval having, initially, a value substantially equal to that of the first time interval, $t_1$;

(iii) iteratively regenerating the signal, $t_2$, until its value no longer changes significantly between iterations; wherein, such regeneration is in accord with the mathematical expression $$t_2 = t_1 + \tau_2^* (1 - e^{-t_2/\tau_2});$$

where $\tau_2$ is a secondary time constant of the process as determined in accord with other aspects of the invention, as described below; and (iv) estimating the dead time $\tau_d$ as a function of the mathematical expression $$\tau_d = \tau_a - t_2$$

where $t_2$ is a final value of that interval, as determined in step (iii), above.

Other aspects of the invention pertain to methods for determining characteristics of self-regulating processes, i.e., those which have a natural tendency to return to a natural equilibrium or steady state. According to one aspect, the invention provides a method for generating a signal $\tau_1$, estimating the primary time constant of a self-regulating process. This is based on evaluation of the mathematical expression $$\tau_1 = \tau_a / ln(1 - OVS)$$

where OVS is a ratio between first and second peak values of the controlled variable during application of the doublet pulse.

Another aspect provides a method for generating a signal, $K_p$, representing a steady-state gain of a first-order self-regulating process, as a function of the mathematical expression $$K_p = \delta c_1 / \delta m^* OVS)$$

where $\delta c_1$ represents a difference between the original value of the controlled variable and its first peak value during application of the doublet pulse.

Still other aspects of the invention provide apparatus operating in accord with the above methodology. These and other aspects of the invention are evident in the description which follows, and in the attached drawings.

DETAILED DESCRIPTION OF THE ILLUSTRATED EMBODIMENT

Figure 1A:
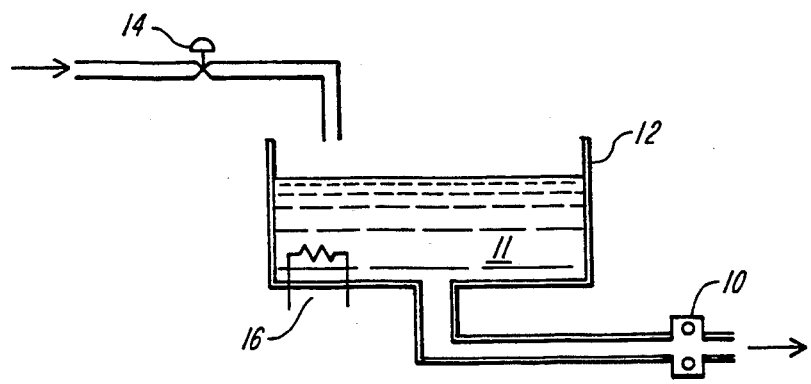
FIG. 1a depicts an exemplary process of the type amenable to analysis in a method according to the invention.
Figure 1B:
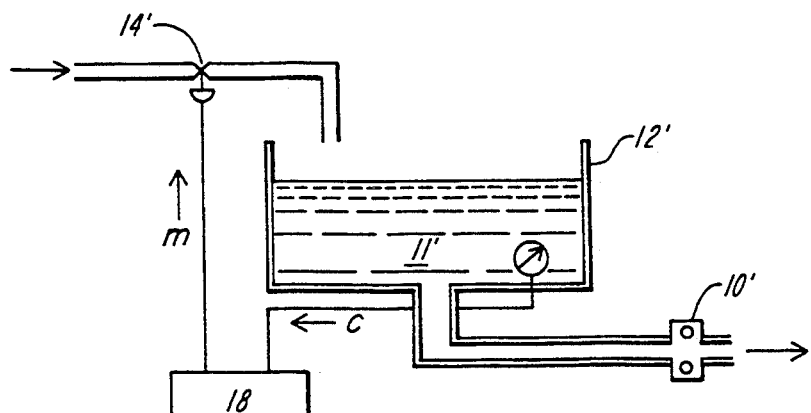
FIG. 1b illustrates the process of FIG. 1a coupled to an apparatus according to the invention for determining the characteristics of that process.

FIG. 1b depicts an exemplary process of the type amenable to analysis by an apparatus constructed and operated in accord with the invention. As above, a metering pump 10' is designed to deliver a constant flow of fluid 11' from tank 12' Inflow to the tank is controlled at valve 14'.

A process controller 18 monitors the level of fluid in the tank 12' and controls the inflow at valve 14'. More particularly, the controller monitors a controlled variable signal, c, representing the level of fluid in the tank. The controller generates a manipulated variable signal, m, that governs the degree of flow through the valve 14'.

The illustrated process is exemplary only and represents any process amenable to analysis in accord with the teachings herein. Moreover, the manipulated and control variable signals, m and c, respectively, can be generated in a conventional manner appropriate to the process under analysis.

Figure 2:
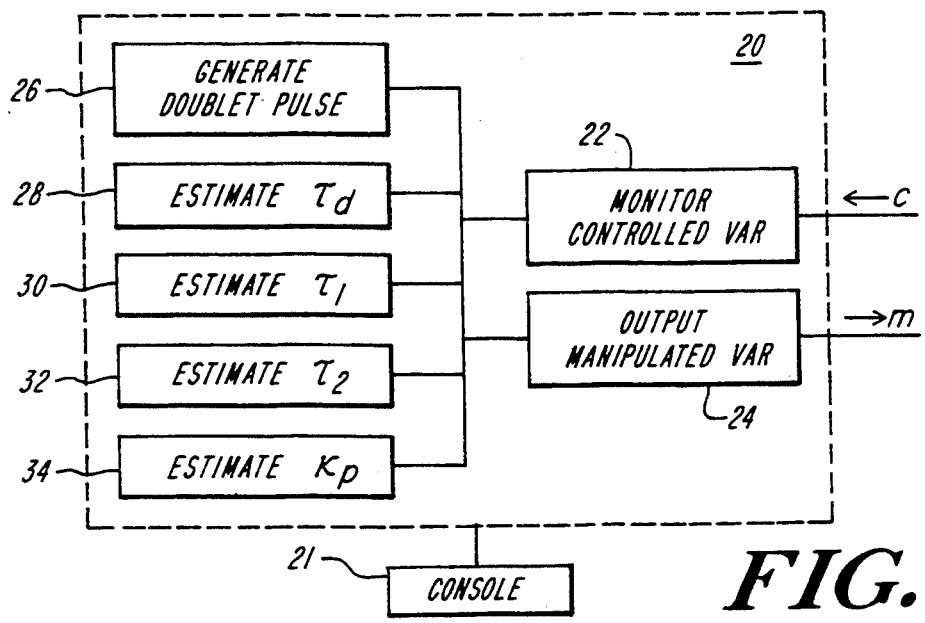
FIG. 2 depicts a preferred structure of an apparatus for determining process characteristics constructed in accord with the invention.

FIG. 2 depicts an apparatus 20 for determining process characteristics constructed in accord with the invention. The apparatus includes a controlled variable signal monitor 22, an element 24 for generating the manipulated variable signal, an element 26 for generating a doublet pulse, and elements 28, 30, 32, 34 for estimating time constants $\tau_1$, $t_2$, $\tau_d$, and $K_p$, respectively. The elements 22–34 are interconnected and operated in the manner described below.

The monitor 22 monitors, or samples, values of the controlled variable c at intervals $\delta t$ in a conventional manner, e.g., under control of a timer or clock. Preferably, the sampled values are stored in an array; alternatively, they can be stored in a file, in registers, or in other like manner.

Figure 3:
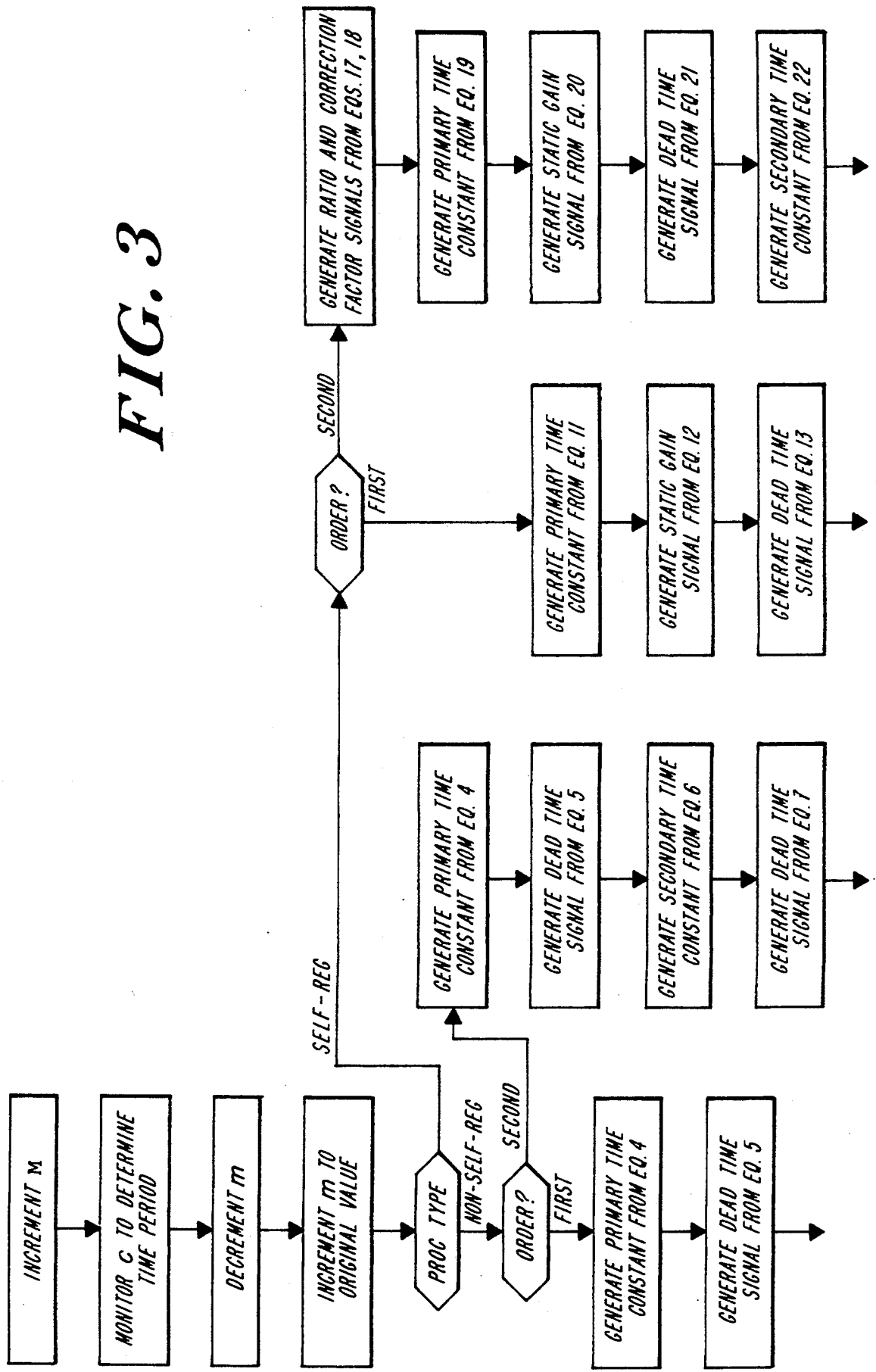
FIG. 3 depicts a preferred method for determining process characteristics in accord with the invention.

The doublet pulse generating element 26 generates a manipulated variable signal in the form of a doublet pulse. Particularly, as illustrated in FIG. 3, the element 26 increments the manipulated variable signal, m, a predetermined amount, $\delta m$. The element 26 notes changes in the controlled variable signal, c, resulting from the incrementing of manipulated variable signal, to determine the time period, $\tau_a$, before the controlled variable signal changes from its original value by a predetermined noise band amount, NB. Once the controlled variable has changed by that amount, the element 26 decrements the manipulated variable stepwise by an amount $-2 \times \delta m$. After another time interval $\tau_a$, the element 26 increments the manipulated variable an amount $\delta m$ to bring it to its original value.

Those skilled in the art will appreciate that illustrated apparatus 20, including elements 22–24 therein, can be implemented based on the teachings herein in special purpose hardware. Preferably, those elements are implemented in software for execution, e.g., on a general purpose microprocessor. In this regard, it will be appreciated that such implementation can be attained using conventional programming techniques as particularly adapted in accord with the teachings herein to provide the disclosed structure, signaling and functionality.

The process characteristics determined, e.g., by such an apparatus 20, in accord with the teachings herein can be used in connection with the methods and apparatus disclosed in the above-cited related patent applications.

Referring to FIG. 3, an apparatus 20 according to the invention analysis proceeds according to the type and order of the process being analyzed, to wit, whether the process is self-regulating or non-self-regulating process and whether it is first-order or second-order. A determination as to type and order can be determined automatically in the manner discussed below.

Figure 4:
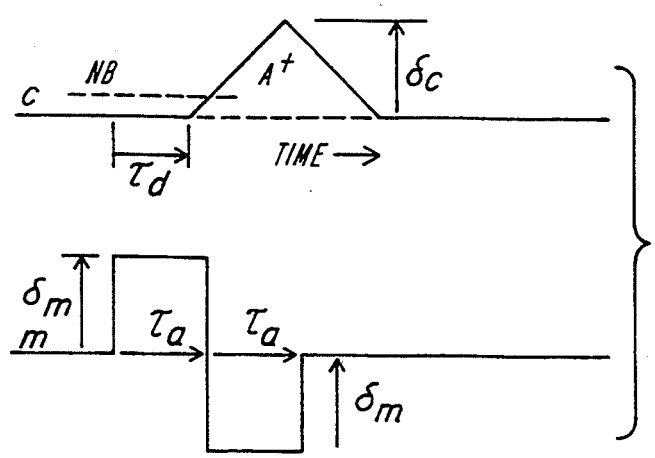
FIGS. 4-6 dipict doublet pulses and their effect on first-order non-self-regulating, second-order non-self-regulating, and first-order self-regulating processes.

Referring, to FIG. 4 there is shown the effect of the doublet pulse on a 1st-order non-self-regulating process. As illustrated, the first pulse of the manipulated variable, m, drives the controlled variable c at a rate:

$$dc/dt = \delta m/\tau_1 \qquad (1)$$

where $\tau_1$ is the integrating time constant of the process.

The change in the signal c in response to the initial pulse can be represented as follows:

$$\delta c = \delta m(\tau_a)/\tau_1 \qquad (2)$$

where $\tau_a$ is the width of the pulse.

The downward pulse of the manipulated variable signal drives the controlled variable signal c back to its original value in the same way, producing an integrated deviation A+.

The element 30 generates a signal, A+, representing the integrated deviation in accord with the mathematical relation:

$$A^+ = \delta m(\tau_a^2)/\tau_1 \qquad (3)$$

From that signal, A+, the element 30 generates a signal, $\tau_1$, representative of an estimate of the primary time constant of the process. Particularly, it generates the signal, $\tau_1$, in accord with the mathematical relation.

$$\tau_1 = \delta m(\tau_a^2)/A^+ \qquad (4)$$

Based on that result, the element 28 generates a signal, $\tau_d$, representing an estimate of the dead time. That signal is determined by subtracting $\tau_a$ from the time required for c to reach the noise band, NB, as expressed by the following mathematical relation:

$$\tau_d = \tau_a - (NB^*\tau_1/\delta m) \qquad (5)$$

The apparatus 20 can determine whether a non-self-regulating process is of the first or second order by comparing the time interval $\tau_a$ with the factor $A^+/\delta c$. If those values are equal—that is, $A^+/\delta c = \tau_a$—then the process is deemed to be of the first order; otherwise, it is deemed to be of the second order.

Figure 5:
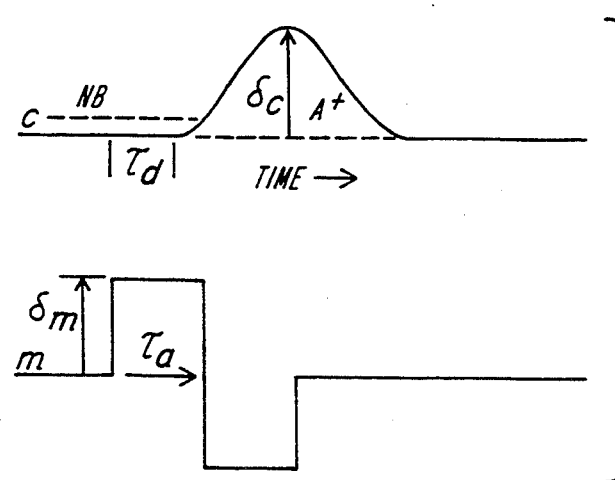

FIG. 5 depicts the effect of application of a doublet pulse to a 2nd-order non-self-regulating process.

At the outset, it is noted that the area under the curve A+ is not affected by the secondary lag.

However, the secondary time constant of the process reduces the peak height $\delta c$. By monitoring that peak height, element 32 can generate a signal $\tau_2$ representative of the secondary time constant according to the mathematical relation:

$$\tau_2 = A^+/\delta c - \tau_a \qquad (6)$$

The time required for the controlled variable signal c to reach the noise-band limit, NB, is a complex function of both time constants $\tau_1$ and $\tau_2$. The dead time element 28 generates the signal $\tau_d$ approximating that dead time by executing the following steps:

i) computing a first time interval $t_1$ as a function of the mathematical expression $$t_1 = NB^*\tau_1/|\delta m|$$

ii) initializing a second time interval $t_2$ to have a value substantially equal to that of the first time interval, $t_1$, iii) iteratively determining the second time interval $t_2$ in accord with the mathematical expression $$t_2 = t_1 + \tau_2^*(1 - e^{-t_2/\tau_2})$$

until a difference between successive iterative values of the second time interval $t_2$ are within a predetermined range, and where $\tau_2$ is a secondary time constant of the non-self-regulating process, iv) estimating the dead time $\tau_d$ as a function of the expression $$\tau_d = \tau_a - t_2 \qquad (7)$$

where $t_2$ is a final value resulting from step (iii).

Figure 6:
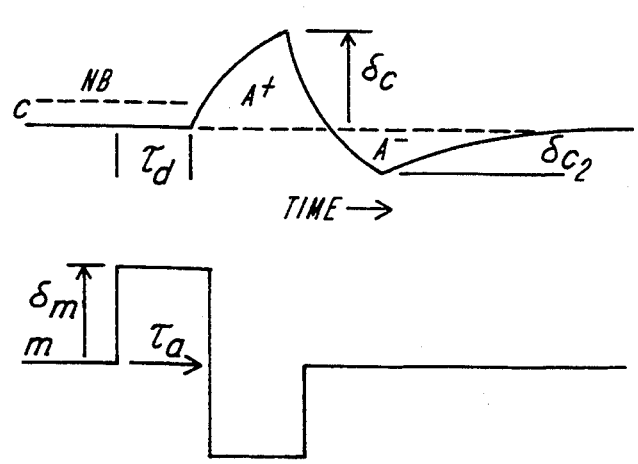

FIG. 6 illustrates the effect of application of a doublet pulse to a 1st-order self-regulating process. In this instance, the controlled variable overshoots its original value, resulting in an area A+ which is compensated by an equal and opposite area A−.

Illustrated peak, $\delta c_1$, is an exponential function of time (pulse duration), as expressed by the following mathematical relation:

$$\delta c_1 = K_p \delta m(1 - e^{-\tau_a/\tau_1}) \qquad (8)$$

where $K_p$ is the process steady-state gain.

The height of the second peak, $\delta c_2$, can be expressed by the mathematical relation:

$$\delta c_2 = -K_p \delta m(1 - e^{-\tau_a/\tau_1})^2$$

The overshoot is the ratio of the first and second peaks, $\delta c_1$ and $\delta c_2$, expressed as follows $$OVS = -\delta c_2/\delta c_1 - 1 - e^{-\tau_a/\tau_1} \qquad (10)$$

Accordingly, for a self-regulating process, the primary time constant estimator 30 generates the signal $\tau_1$, representative of an estimate of the primary time constant in accord with the mathematical relationship:

$$\tau_1 = -\tau_a/ln(1 - OVS) \qquad (11)$$

The static gain estimation element, 34, generates a signal $K_p$, representing an estimate of the process's gain, in accord with the mathematical relation:

$$K_p = \tau c_1/\delta m^*OVS) \qquad (12)$$

The time required for the controlled variable signal, c, to reach the noise band, NB, is an exponential function of $K_p$ and $\tau_1$. The dead time estimator 28 generates a signal $\tau_d$ representative of the process dead time in accord with the expression $$\tau_d = \tau_a + \tau_1 ln(1 - NB/K_p \delta m) \tag{13}$$

If the self-regulating process under analysis is of the second order, the secondary lag rounds the peaks and shifts them to the right. It also reduces the areas $A^+$ and $A^-$ (although maintaining their equality). Accordingly, for a second order self-regulating process, parameters $K_p$, $\tau_1$, and $\tau_2$ cannot be determined directly, but must be estimated by approximation.

To begin, Equation (11) approximates the sum of $\tau_1$ and $\tau_2$:

$$\Sigma\tau = -\tau_a/ln(1-OVS) \tag{14}$$

Although, the accuracy of this decreases as $\tau_1$ approaches $T_2$.

The ratio $A^+/\delta c_1$ is quite sensitive to the ratio of $\tau_2/\tau_1$. Consequently, the ratio is first calculated as if the process were first-order. To wit, the apparatus 20 determines the ratio in accord with the relation:

$$(A^+/\delta c_1)_1 = [\tau_a - \Sigma\tau * ln(1+OVS)]/OVS \tag{15}$$

Using the result of that determination, a difference ratio signal $\delta A$ is generated in accord with the relation:

$$\delta A = (A^+/\delta c_1) - (A^+/\delta c_1)_1 \tag{16}$$

The estimated ratio $R = \Sigma\tau/\tau_a$ is a function of the overshoot, OVS. The apparatus 20 determines a ratio signal R in accord with the expression $$R = -1/ln(1-OVS) \tag{17}$$

If R is greater than or equal to four, then the apparatus generates two correction factors $CF_1$ and $CF_2$ in accord with the mathematical relation $$CF_1 = 1 + \delta A * (0.78 * ln(R) - 1.06) \tag{18a}$$

$$CF_2 = 4 * \delta A * R^{-1.5} \tag{18b}$$

If R is less than four, then the apparatus performs the following steps to set the correction factor signals:
1) generate a signal, $\delta A_{max}$, as a function of the mathematical expression $$\delta A_{max} = 0.051 * e^{(0.82*R)}$$

2) if R less than or equal to two, generate a coefficient signal b having a value 0.5; otherwise, generate a coefficient signal, b, as a function of the mathematical expression $$b = 0.4 + 0.38 * \delta A_{max}$$

3) if $\delta A$ is greater than or equal to $\delta A_{max}$, reset the correction factors signals $CF_1$ and $CF_2$ to values equal to the coefficient signal b;
4) otherwise, if $\delta A$ is less than $\delta A_{max}$, generate the correction factors signals as functions of the mathematical expressions $$CF_1 = b + (1 - b) * \sqrt{1 - \delta A/\delta A_{max}} \tag{18c}$$

$$CF_2 = b * (1 - \sqrt{1 - \delta A/\delta A_{max}}) \tag{18d}$$

From this, the primary time constant estimator 30 generates a signal $\tau_1$ representative Of the primary time constant of the second-order self-regulating process as follows:

$$\tau_1 = CF_1 * \Sigma\tau \tag{19}$$

The second time constant estimator 32 generates the signal $\tau_2$ in accord with Eq. 22, below.

The steady state element 34, then generates the signal $K_p$, estimating the steady-state gain in accord with the expression $$K_p = (\delta c_1/\delta m * OVS)) * e^{1.3 * \delta A} \tag{20}$$

Further, the element 28 generates the dead time signal $\tau_d$ for 2nd-order non-self-regulating processes by executing the following steps:
i) estimating whether the secondary time constant $\tau_2$ is substantially equal to the primary time constant $\tau_1$ and, if so, generating a time interval $t_2$ as a function of the mathematical expression $$t_2 = 1.65 * \tau_1 * \sqrt{NB/|K_p * \delta m|}$$

ii) estimating whether said secondary time constant $\tau_2$ is less than the primary time constant $\tau_1$ and, if so, determining the second time interval $t_2$ iteratively in accord with the expression $$t_2 = -\tau_1 * ln\{[\tau_2 * e^{-22/\tau_2} + (\tau_1 - \tau_2) * (1 - NB/|K_p * \delta m|)]/\tau_1\}$$

iii) estimating the dead time, $\tau_d$, as a function of the mathematical expression $$\tau_d = \tau_a - t_2 \tag{21}$$

As noted above, the second time constant estimator 32 generates the signal $\tau_2$ in accord with the mathematical relation:

$$\tau_2 = CF_2 * \Sigma\tau \tag{22}$$

Summary

The foregoing describes methods and apparatus for determining characteristics of a process, such as primary and second time constants, dead-time, and gain, by applying a doublet pulse and measuring the process response. These methods and apparatus provide the simplicity, accuracy and effectiveness demanded by the art.

Those skilled in the art will appreciate that the illustrated embodiment is exemplary, and that other embodiments incorporating additions and modifications to that described above fall within the scope of the invention.

In view of the foregoing, what I claim is:

1. A method of testing a non-self-regulating process that is controlled by application thereto of a manipulated variable signal to vary a first characteristic thereof, and that generates a controlled variable signal representative of that first characteristic, the improvement for determining a time constant of said process comprising the steps of:

A. applying a doublet pulse to said process by
   i) incrementing said manipulated variable signal from an original value a predetermined amount, $\delta m$, to cause said controlled variable signal to change from an original value thereof,
   ii) monitoring said controlled variable signal to determine a time period, $\tau_a$, after such incrementing, over which the controlled variable signal changes from its original value by a predetermined amount, NB,
   iii) responding to such determination by decrementing said manipulated variable signal stepwise by an amount substantially equal to, $-2 \times \delta m$, and
   iv) incrementing, after another time interval, $\tau_a$, said manipulated variable signal substantially to said original value, and
B. determining said time constant of said process as a function of a time-wise change in a value of said controlled variable signal during application of said doublet pulse.

2. A method according to claim 1, wherein said determining step includes the steps of
A. integrating a value of said controlled variable signal as a function of time during application of said doublet pulse to produce a value $A^+$, and
B. estimating a primary time constant, $\tau_1$, of said process as a function of the mathematical expression $$\tau_1 = (\delta m \tau_a^2)/A^+.$$

3. A method according to claim 2, including the step of estimating a dead time, $\tau_d$, of at least a selected non-self-regulating process as a function of the mathematical expression $$\tau_d = \tau_a - (NB\tau_1/\delta m).$$

4. A method according to claim 3, including the step of selecting a first-order non-self-regulating process to be one for which such dead time, $\tau_d$, is to be estimated as a function of the mathematical expression $$\tau_d = \tau_a - (NB\tau_1/\delta m).$$

5. A method according to claim 3, including the steps of
A. determining a difference, $\delta c$, between the original value of the controlled variable signal and a value of that signal at a peak amplitude thereof during application of said doublet pulse,
B. identifying as a first-order non-self-regulating process one for which the time period, $\tau_a$, is substantially equal to $A^+/\delta c$.

6. A method according to claim 2, including the steps of
A. determining a difference, $\delta c$, between the original value of the controlled variable signal and a value of that signal at a peak amplitude thereof during application of said doublet pulse,
B. of estimating a secondary time constant, $\tau_2$, of at least a selected non-self-regulating process as a function of the mathematical expression $$\tau_2 = A^+/\delta c - \tau_a.$$

7. A method according to claim 6, including the step of selecting a second-order non-self-regulating process to be one for which such secondary time constant, $\tau_2$, is to be estimated as a function of the mathematical expression $$\tau_2 = A^+/\delta c - \tau_a.$$

8. A method according to claim 7, including the step of identifying as a second-order non-self-regulating process one for which the time period, $\tau_a$, is not substantially equal to $A^+/\delta c$.

9. A method according to claim 2, including the step of estimating the dead time, $\tau_d$, of at least a selected non-self-regulating process by:
A. computing a first time interval $t_1$ as a function of the mathematical expression $$t_1 = NB^* \tau_1 / |\delta m|.$$

B. initializing a second time interval $t_2$ to have a value substantially equal to that of the first time interval, $t_1$,
C. iteratively determining said second time interval $t_2$ in accord with the mathematical expression $$t_2 = t_1 + \tau_2^*(1 - e^{-t_2/\tau_2})$$

until a difference between successive iterative values of said second time interval $t_2$ are within a predetermined range, and
where $\tau_2$ is a secondary time constant of said selected non-self-regulating process,
D. estimating such dead time $\tau_d$ as a function of the expression $$\tau_d = \tau_a - t_2$$

where $t_2$ is a final value resulting from said iteratively calculating step.

10. A method according to claim 9, including the step of selecting a second-order non-self-regulating process to be one for which such dead time, $\tau_d$, is to be estimated as a function of the mathematical expression $$\tau_d = \tau_a - t_2.$$

11. A method according to claim 10, including the steps of
A. determining a difference, $\delta c$, between the original value of the controlled variable signal and a value of that signal at a peak amplitude thereof during application of said doublet pulse,
B. identifying as a second-order non-self regulating process one for which the time period, $\tau_a$, is not substantially equal to $A^+/\delta c$.

12. A method of testing a self-regulating process that is controlled by application of a manipulated variable signal thereto to vary a first characteristic thereof, and that generates a controlled variable signal representative of that first characteristic, the improvement for determining a second characteristic of said process comprising the steps of:
A. applying a doublet pulse to said process by
   i) incrementing said manipulated variable signal from an original value a predetermined amount, $\delta m$, to cause said controlled variable signal to change from an original value thereof, ii) monitoring said controlled variable signal to determine a time period, $\tau_a$, after such incrementing, over which the controlled variable signal changes from original value by a determined amount, NB, iii) responding to such determination by decrementing said manipulated variable signal stepwise an amount, $-2 \times \delta m$, iv) incrementing, after another time interval $\tau_a$, said manipulated variable signal to said original value, and B. determining said second characteristic of said process as a function of a time-wise change in a value of said controlled variable signal during application of said doublet pulse.

13. A method according to claim 12, wherein said determining step includes the steps of A. identifying a first peak value, $\delta c_1$, representing a difference between the original value of the controlled variable signal and a value of that signal at a first peak amplitude thereof during application of said doublet pulse, B. identifying a second peak value $\delta c_2$, representing a difference between the original value of the controlled variable signal and the value of that signal at a second, subsequent peak amplitude thereof during application of said doublet pulse, C. determining an overshoot ratio, OVS, of said process as a function of the mathematical expression $$OVS = -\delta c_2/\delta c_1.$$

14. A method according to claim 13, wherein said determining step includes the step of estimating a primary time constant, $\tau_1$, of at least a selected self-regulating process as a function of the mathematical expression $$\tau_1 = -\tau_a/ln(1-OVS).$$

15. A method according to claim 13, wherein said determining step includes the step of estimating a steady-state gain, $K_p$, of at least a selected self-regulating process as a function of the mathematical expression $$K_p = \delta c_1/(\delta m * OVS).$$

16. A method according to claim 14, wherein said determining step includes the steps of A. estimating a steady state gain, $K_p$, of at least a selected self-regulating process as a function of the mathematical expression $$K_p = \delta c_1/(\delta m * OVS)$$

B. estimating a dead time $\tau_d$, of that process as a function of the mathematical expression $$\tau_d = \tau_a + \tau_1 * ln(1-NB/(K_p*\delta m)).$$

17. A method according to any of claims 14–16, including the step of selecting a first-order self-regulating process as said selected self-regulating process.

18. A method according to claim 13, wherein said determining step includes the step of executing the following operations for at least a selected self-regulating process:

A. estimating a total time lag, $\Sigma\tau$, as a function of the mathematical expression $$\Sigma\tau = -\tau_a/ln(1-OVS)$$

B. integrating a value of said controlled variable signal as a function of time, during a period when that variable signal exceeds its original value and during application of said doublet pulse, to produce a value $A^+$, C. computing a first ratio, $(A^+/\delta c_1)_1$, as a function of the mathematical expression $$(A^+/\delta c_1)_1 = [\tau_a - (\Sigma\tau * ln(1+OVS))]/OVS$$

D. computing a difference between ratios, $\delta A$, as a function of the mathematical expression $$\delta A = (A^+/\delta c_1) - (A^+/\delta c_1)_1$$

E. computing a second ratio, R, as a function of the mathematical expression $$R = -1/ln(1-OVS)$$

F. responding to a value of R greater than or equal to 4 for generating correction factors $CF_1$ and $CF_2$ as functions of the mathematical expressions $$CF_1 = 1 + \delta A * (0.78 * ln(R) - 1.06)$$

$$CF_2 = 4 * \delta A * R^{-1.5}$$

G. responding to a value of R less than 4 for i) determining a maximum estimate of $\delta A$, namely $\delta A_{max}$, as a function of the mathematical expression $$\delta A_{max} = 0.051 * e^{(0.82*R)}$$

ii) responding to a value of R less than or equal to 2 for defining a coefficient b to a value of 0.5, and responding to a value of R greater than 2 for defining said coefficient, b, as a function of the mathematical expression, otherwise giving b the value $$b = 0.4 + 0.38 * \delta A_{max}$$

iii) responding to a value of $\delta A$ being greater than or equal to $\delta A_{max}$ for generating correction factors $CF_1$ and $CF_2$ as equal to coefficient be, and for otherwise estimating these correction factors as a function of the mathematical expression $$CF_1 = b + (1-b) * \sqrt{1 - \delta A/\delta A_{max}}$$

$$CF_2 = b * (1 - \sqrt{1 - \delta A/\delta A_{max}})$$

H. estimating said primary time constant $\tau_1$ according to the mathematical expression $$\tau_1 = CF_1 * \Sigma\tau.$$

19. A method according to claim 13, wherein said determining step includes the step of executing the following operations for at least a selected self-regulating process:

A. generating a summation signal, $\Sigma\tau$, as a function of the mathematical expression $$\Sigma\tau = -\tau_a/ln(1-(OVS))$$

B. integrating a value of said controlled variable signal as a function of time, during a period when that variable signal exceeds its original value, during application of said doublet pulse to produce a value $A^+$, C. computing a first ratio, $(A^+/\delta c_1)_1$, as a function of the mathematical expression $$(A^+/\tau c_1)_1 = [\tau_a - (\Sigma\tau^* ln(1+OVS))]/OVS$$

D. computing a difference $\delta A$ of ratios as a function of the mathematical expression $$\delta A = (A^+/\delta c_1) - (A^+/\delta c_1)_1$$

E. computing said steady-state gain $K_p$ as a function of the mathematical expression $$K_p + (\delta c_1/(\delta m^* OVS))^* e^{1.3^* \delta A}.$$

20. A method according to claim 18, wherein said executing step includes the step of estimating a secondary time constant, $\tau_2$, as a function of the mathematical expression $$\tau_2 = CF_2^* \Sigma\tau.$$

21. A method according to claim 20, comprising the step of estimating a dead time, $\tau_d$, of at least a self-regulating process having a secondary time constant $\tau_2$, said estimating step comprising the steps of:

A. estimating whether said secondary time constant $\tau_2$ is substantially equal to said primary time constant $\tau_1$, and responding to such estimation for determining a value for a time interval $t_2$ as a function of the mathematical expression $$t_2 = 1.65^* \tau_1^* \sqrt{NB/|K_p^* \delta m|}$$

B. estimating whether said secondary time constant $\tau_2$ is not substantially equal to said primary time constant $\tau_1$ for determining a value for said time interval $t_2$ iteratively, until it no longer changes significantly, as a function of the mathematical expression $$t_2 = -\tau_1^* ln\{[\tau_2^* e^{-t2/\tau^2} + (\tau_1 - \tau_2)^*(1 - NB/|Kp^* \delta m|)]/\tau_1\}$$

C. estimating a dead time, $\tau_d$, as a function of the mathematical expression $$\tau_d = \tau_a - t_2.$$

22. A method according to any of claims 18–21, including the step of selecting a second-order self-regulating process as said selected self-regulating process.

23. An apparatus for testing a process that is controlled by application of a manipulated variable signal thereto to vary a first characteristic thereof, and that generates a controlled variable signal representative of that first characteristic, said apparatus comprising:

A. monitoring means, coupled with said process, for monitoring said controlled variable signal, B. pulse means coupled with said process and with said monitoring means, for generating a manipulated variable signal representative of a doublet pulse and for applying that signal to said process, comprising:
  (i) means for incrementing said manipulated variable signal from an original value thereof a predetermined amount, $\delta m$, to cause said controlled variable signal to change from an original value thereof,
  (ii) means coupled to said monitoring means for determining a time period, $\tau_a$, after such incrementing, that the controlled variable signal changes from its original value by a predetermined amount, NB,
  (iii) means for decrementing said manipulated variable signal, after said time period $\tau_a$, stepwise an amount substantially equal to, $-2 \times \delta m$, and for incrementing, after another time interval, $\tau_a$, said manipulated variable signal substantially to said original value, and C. analysis means, coupled to said monitoring means, for determining a second characteristic of said process as a function of a time-wise change in said controlled variable signal during application of said doublet pulse.

24. An apparatus according to claim 23, wherein said analysis means includes

A. means for integrating a value of said controlled variable signal as a function of time during application of said doublet pulse to determine a value $A^+$, and for generating a signal representative thereof, and B. primary time constant means for generating a signal representative of a primary time constant, $\tau_1$, of said process in accord with the mathematical expression $$\tau_1 = (\delta m \tau_a^2)/A^+.$$

25. An apparatus according to claim 24, including means for generating a signal representative of a dead time, $\tau_d$, of at least a selected process, wherein that signal is generated in accord with the mathematical expression $$\tau_d = \tau_a - (NB\tau_1/\delta m).$$

26. An apparatus according to claim 25, including means for selecting a first-order non-self-regulating process to be one for which such dead time, $\tau_d$, is to be estimated in accord with the mathematical expression $$\tau_d = \tau_a - (NB\tau_1/\delta m).$$

27. An apparatus according to claim 25, including
A. means for determining a difference, $\delta c$, between the original value of the controlled variable signal and a value of that signal at a peak amplitude thereof during application of said doublet pulse,
B. means for determining whether the time period, $\tau_a$, is substantially equal to factor $A^+/\delta c$,
C. means responsive to an affirmative such determination for identifying the corresponding process as being of the first order.

28. An apparatus according to claim 24, including

A. means for generating a signal, $\delta c$, representative of a difference between the original value of the controlled variable signal and a value of that signal at a peak amplitude thereof during application of said doublet pulse, B. secondary time constant means for generating a signal representative of a secondary time constant, $\tau_2$, of at least a selected non-self-regulating process, said signal being generated in accord with the mathematical expression $$\tau_2 = A^+/\delta c - \tau_a.$$

29. An apparatus according to claim 28, including means for selecting second-order non-self-regulating process to be one for which such secondary time constant, $\tau_2$ is to be estimated in accord with the mathematical expression $$\tau_2 = A^+/\delta c - \tau_a.$$

30. An apparatus according to claim 29, including means identifying as a second-order non-self-regulating process one for which the time period, $\tau_a$, is not substantially equal to $A^+/\delta c$.

31. An apparatus according to claim 24, including dead time means for generating a signal representative of a dead time, $\tau_d$, of at least a selected process, said dead time means including:

A. means for generating a signal representative of a first time interval $t_1$ in accord with the mathematical expression $$t_1 = NB^*\tau_1/|\delta m|$$

B. means for generating a signal representative of a second time interval $t_2$ to have a value substantially equal to that of the first time interval, $t_1$, C. means for iteratively regenerating the signal representative of said second time interval $t_2$ in accord with the mathematical expression $$t_2 = t_1 + \tau_2^*(1 - e^{t_2/\tau_2})$$

until a difference between successive iterative values of said second time interval $t_2$ are within a predetermined range, and
where $\tau_2$ is a secondary time constant of said selected non-self-regulating process, D. means for generating a signal representative of such dead time $\tau_d$ in accord with the expression $$\tau_d = \tau_a - t_2$$

where $t_2$ is a final value resulting from said iteratively calculating step.

32. An apparatus according to claim 31, wherein said secondary time constant means includes means for selecting a second-order non-self-regulating process to be one for which such dead time, $\tau_d$, is to be estimated in accord with the mathematical expression $$\tau_d = \tau_a - t_2.$$

33. An apparatus according to claim 32, wherein said secondary time constant means includes A. means for generating a signal, $\tau c$, representative of a difference between the original value of the controlled variable signal and a value of that signal at a peak amplitude thereof during application of said doublet pulse, B. means identifying as a second-order non-self-regulating process one for which the time period, $\tau_a$, is not substantially equal to $A^+/\delta c$.

34. An apparatus for testing a self-regulating process that is controlled by application of a manipulated variable signal thereto to vary a first characteristic thereof, and that generates a controlled variable signal representative of that first characteristic, said apparatus comprising:

A. monitoring means, coupled with said process, for monitoring said controlled variable signal, B. pulse means, coupled with said process and with said monitoring means, for generating a manipulated variable signal representative of a doublet pulse and for applying that signal to said process, comprising:
(i) means for incrementing said manipulated variable signal form an original value thereof a predetermined amount, $\delta m$, to cause said controlled variable signal to change from an original value thereof.
(ii) means coupled to said monitoring means for determining a time period, $\tau_a$ after such incrementing, that the controlled variable signal changes from its original value by a predetermined amount, NB,
(iii) means for decrementing said manipulated variable signal, after said time period $\tau_a$, stepwise an amount substantially equal to, $-2 \times \delta m$, and for incrementing, after another time interval, $\tau_a$, said manipulated variable signal substantially to said original value, and C. analysis means, coupled to said monitoring means, for determining a second characteristic of said process as a function of a time-wise change in said controlled variable signal during application of said doublet pulse.

35. An apparatus according to claim 34, wherein said analysis means includes

A. identifying a first peak value, $\delta c_1$, representing a difference between the original value of the controlled variable signal and a value of that signal at a first peak amplitude thereof during application of said doublet pulse, B. identifying a second peak value, $\delta c_2$, representing a difference between the original value of the controlled variable signal and the value of that signal at a second, subsequent peak amplitude thereof during application of said doublet pulse, C. determining an overshoot ratio, OVS, of said process in accord with the mathematical expression $$OVS = \delta c_2/\delta c_1.$$

36. An apparatus according to claim 35, wherein said analysis means includes primary time constant means for generating a signal representative of an estimate of a primary time constant, $\tau_1$, of at least a selected self-regulating process, said signal being generated in accord with the mathematical expression $$\tau_1 = \tau_a/\ln(1 - OVS).$$

37. An apparatus according to claim 35, wherein said analysis means includes stead-state gain means for generating a signal, $K_p$, representative of a steady-state gain of at least a selected self-regulating process, said signal being generated in accord with the mathematical expression $$K_p = \delta c_1/(\delta m * OVS).$$

38. An apparatus according to claim 36, wherein said analysis means includes
  A. steady state gain means for generating a signal, $K_p$, representative of a steady state gain of at least a selected self-regulating process, said signal being generated in accord with the mathematical expression $$K_p = \delta c_1/(\delta m * OVS)$$

B. dead time means for generating a signal, $\tau_d$, representative of a dead time of that process, said signal being generated in accord with the mathematical expression $$\tau_d = \tau_a + \tau_1 * ln(1 - NB/(K_p * \delta m)).$$

39. An apparatus according to any of claim 36-38, including selecting a first-order self-regulating process as said selected self-regulating process.

40. An apparatus according to claim 35, wherein said analysis means includes means for executing the following operations for at least a selected self-regulating process:
  A. generating a signal, $\Sigma\tau$, representative of a total time lag in accord with the mathematical expression $$\Sigma\tau = -\tau_a/ln(1 - OVS)$$

B. generating a signal, A+, representative of an integration of a value of said controlled variable signal as a function of time, during a period when that variable signal exceeds its original value and during application of said doublet pulse,
  C. generating a signal, $(A+/\delta c_1)_1$, in accord with the mathematical expression $$(A+/\delta c_1)_1 = [\tau_a - (\Sigma\tau * ln(1+OVS))]/OVS$$

D. generating a signal, $\delta A$, in accord with the mathematical expression $$\delta A = (A+/\delta c_1) - (A+/\delta c_1)_1$$

E. generating a signal, R, in accord with the mathematical expression
  $$R = -1/ln(1-OVS)$$

F. responding to a value of R greater than or equal to 4 for generating correction factor signals $CF_1$ and $CF_2$ in accord the mathematical expressions $$CF_1 = 1 + \delta A * (0.78 * ln(R) - 1.06)$$

$$CF_2 = 4 * \delta A * R^{-1.5}$$

G. responding to a value of R less than 4 for
    i) generating a signal, $\delta A_{max}$, in accord with the mathematical expression $$\delta A_{max} = 0.051 * e^{(0.82 * R)}$$

ii) responding to a value of R less than or equal to 2 for generating a coefficient signal, b, to having a value of 0.5, and responding to a value of R greater than 2 for generating said coefficient signal, b, in accord with the mathematical expression $$b = 0.4 + 0.38 * \delta A_{max}$$

iii) responding to a value of $\delta A$ being greater than or equal to $\delta A_{max}$ for generating correction factor signal $CF_1$ and $CF_2$ as equal to said coefficient signal b, and for responding to a value of $\delta A$ being less $\delta A_{max}$ for generating these correction factor signals in accord with the mathematical expression $$CF_1 = b + (1-b) * \sqrt{1 - \delta A/\delta A_{max}}$$

$$CF_2 = b * (1 - \sqrt{1 - \delta A/\delta A_{max}})$$

H. generating a primary time constant $\tau_1$ in accord with the mathematical expression $$\tau_1 = CF_1 * \Sigma\tau.$$

41. An apparatus according to claim 35, wherein said analysis means includes means for executing the following operations for at least a selected self-regulating process:
  A. generating a summation signal, $\Sigma\tau$, in accord with the mathematical expression $$\Sigma\tau = \tau_a/ln(1-OVS)$$

B. generating a signal A+ representative of an integration of a value of said controlled variable signal as a function of time, during a period when that variable signal exceeds its original value, during application of said doublet pulse to produce a value A+,
  C. generating a first ratio signal, $(A+/\delta c_1)$, in accord with the mathematical expression $$(A+/\delta c_1)_1 = [\tau_a - (\Sigma\tau * ln)1 + OVS))]/OVS$$

D. generating a difference of ratios signal $\delta A$ in accord with the mathematical expression $$\delta A = (A+/\delta c_1) - (A+/\delta c_1)_1$$

E. generating a steady-state gain signal $K_p$ in accord with the mathematical expression $$K_p = (\delta c_1/(\delta m * OVS)) * e^{1.3 * \delta A}.$$

42. An apparatus according to claim 40, wherein including means for estimating a secondary time constant, $\tau_2$, in accord with the mathematical expression $$\tau_2 = CF_2 * \Sigma\tau.$$

43. An apparatus according to claim 42, comprising means for generating a dead time signal, $\tau_d$, of at least a self-regulating process having a secondary time constant $\tau_2$, by executing the following operations:
  A. estimating whether said secondary time constant $\tau_2$ is substantially equal to or greater than said primary time constant $\tau_1$, and responding to such estimation for determining a value for a time interval $t_2$ in accord with the mathematical expression $$t_2 = 1.65 * \tau_1 * \sqrt{NB/|K_p * \delta m|}$$

where $K_p$ is a steady state gain of the process

B. estimating whether said secondary time constant $\tau_2$ is not substantially equal to or greater than said primary time constant $\tau_1$ for determining a value for said time interval $t_2$ iteratively, until it no longer changes significantly, in accord with the mathematical expression $$t_2 = -\tau_1 * ln\{[\tau_2 * e^{-t_2/\tau_2} + (\tau_1 - \tau_2) * (1 - NB/|K_p * \delta m|)]/\tau_1\}$$

C. generating said dead time signal, $\tau_d$, in accord with the mathematical expression $$\tau_d = \tau_a - t_2.$$

44. An apparatus according to any of claim 40–43, including selecting a second-order self-regulating process as said selected self-regulating process.

* * * * *